United States Patent
Nakao et al.

(10) Patent No.: US 8,564,945 B2
(45) Date of Patent: Oct. 22, 2013

(54) SLIDE TYPE ELECTRONIC APPARATUS

(75) Inventors: Junichi Nakao, Tokyo (JP); Hiroshi Yamada, Kakegawa (JP); Toshiki Yamanaka, Kakegawa (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 13/059,102

(22) PCT Filed: Sep. 15, 2009

(86) PCT No.: PCT/JP2009/066576
§ 371 (c)(1),
(2), (4) Date: Feb. 15, 2011

(87) PCT Pub. No.: WO2010/032864
PCT Pub. Date: Mar. 25, 2010

(65) Prior Publication Data
US 2011/0149492 A1   Jun. 23, 2011

(30) Foreign Application Priority Data
Sep. 22, 2008   (JP) .................................. 2008-242678

(51) Int. Cl.
*G06F 1/16* (2006.01)
(52) U.S. Cl.
USPC .............. 361/679.3; 361/679.55; 361/679.56; 455/575.1; 455/575.4
(58) Field of Classification Search
USPC ................................................... 361/679.56
See application file for complete search history.

(56) References Cited

U.S. PATENT DOCUMENTS

| | | | | |
|---|---|---|---|---|
| 7,209,772 | B2 * | 4/2007 | Crisp ........................ | 455/575.4 |
| 2007/0275774 | A1 | 11/2007 | Fagrenius et al. | |
| 2009/0312077 | A1 * | 12/2009 | Fagrenius et al. ......... | 455/575.4 |
| 2012/0002390 | A1 | 1/2012 | Komiyama | |

FOREIGN PATENT DOCUMENTS

| | | |
|---|---|---|
| JP | 11-55376 A | 2/1999 |
| JP | 11-208380 A | 8/1999 |
| JP | 2003298699 A | 10/2003 |
| JP | 2005136600 A | 5/2005 |
| JP | 2006140814 A | 6/2006 |
| JP | 2006157465 A | 6/2006 |
| JP | 2006186577 A | 7/2006 |
| JP | 2006319419 A | 11/2006 |
| JP | 2007288436 A | 11/2007 |
| WO | 2005/117399 A1 | 12/2005 |
| WO | 2007100023 A1 | 9/2007 |

OTHER PUBLICATIONS

International Search Report for PCT/JP2009/066576 mailed Jan. 12, 2010.
European Search report for EP09814707.7 dated Nov. 21, 2012.
Japanese Office Action for JP 2008-242678 mailed on Apr. 16, 2013 with English Translation.

\* cited by examiner

*Primary Examiner* — Anthony Q Edwards

(57) ABSTRACT

A slide type electronic apparatus which can prevent internal structure such as a slide mechanism from being visually recognized from a gap between two cases and suppress dirt, dust and the like invading from the gap is provided. A slide type electronic apparatus according to the present invention includes: two cases; slide means, which is arranged between the two cases, for connecting the two cases in a manner that the two cases can slide each other; and covering means, which is arranged in one of the cases, for hiding a gap formed between the two cases at least at a time of an opened state in which an overlap of the two cases becomes smallest.

11 Claims, 12 Drawing Sheets

SLIDE TYPE ELECTRONIC APPARATUS

This application is the National Phase of PCT/JP2009/066576, filed Sep. 15, 2009, which claims priority based on Japanese application Japanese Patent Application No. 2008-242678 filed on Sep. 22, 2008, the disclosure of which is incorporated herein in its entirety.

TECHNICAL FIELD

The present invention relates to a slide type electronic apparatus including two cases connected in a manner that they can slide each other and move relatively.

BACKGROUND ART

In recent years, a slide type electronic apparatus that can be taken along easily without requiring a large space has been proposed and comes to practical use in order to satisfy both of increase in functionality and miniaturization of an electronic apparatus such as a mobile phone. Slide type electronic apparatuses are disclosed in Japanese Patent Application Laid-Open No. 2003-298699, Japanese Patent Application Laid-Open No. 2005-136600, Japanese Patent Application Laid-Open No. 2006-140814 and Japanese Patent Application Laid-Open No. 2006-319419, for example.

The slide type electronic apparatuses disclosed in these official bulletins include two cases connected in a manner that they can slide each other and move relatively. A slide type electronic apparatus has various operation keys on the front face of one case and has a display screen such as a liquid crystal display panel on the front face of the other case, for example. The cases are arranged such that the front face of one case and the back face of the other case face each other and they are connected using a slide mechanism.

In a slide type electronic apparatus configured as mentioned above, when browsing or the like of the display screen is performed, it can be used in a closed state where the two cases overlap each other. On the other hand, when performing input or the like of various kinds of information, by making the two cases be in an opened state by sliding them each other into a stretched state and exposing operation keys provided on the front face of one case, various information is inputted in this opened state.

DISCLOSURE OF INVENTION

Technical Problem

In general, in a slide type electronic apparatus, a certain gap is formed between two cases that face each other sandwiching a slide mechanism. When the gap is large, internal structure such as the slide mechanism and a flexible substrate is seen from the gap. In addition, dirt and dust and the like invades inside the cases from the gap.

The present invention has been made in view of the above-mentioned problems, and its object is to provide a slide type electronic apparatus which can prevent internal structure such as a slide mechanism from being visually recognized from a gap between two cases and suppress invasion of dirt and dust and the like from the gap.

Solution to Problem

In order to achieve the above-mentioned object, a slide type electronic apparatus according to the present invention includes: slide means, which is arranged between two cases, for connecting the two cases in a manner that they can slide each other; and covering means, which is arranged in one of the cases, for hiding a gap formed between the two cases at least at a time of an opened state in which an overlap of the two cases becomes smallest.

Advantageous Effects of Invention

The slide type electronic apparatus according to the present invention can prevent internal structure such as a slide mechanism from being visually recognized from a gap between two cases and can suppress invasion of dirt, dust and the like from the gap.

BRIEF DESCRIPTION OF DRAWINGS

The object mentioned above, and other objects, features and advantages will become clearer by the preferred embodiments described below and accompanying drawings.

REFERENCE SIGNS LIST

Figure 1:
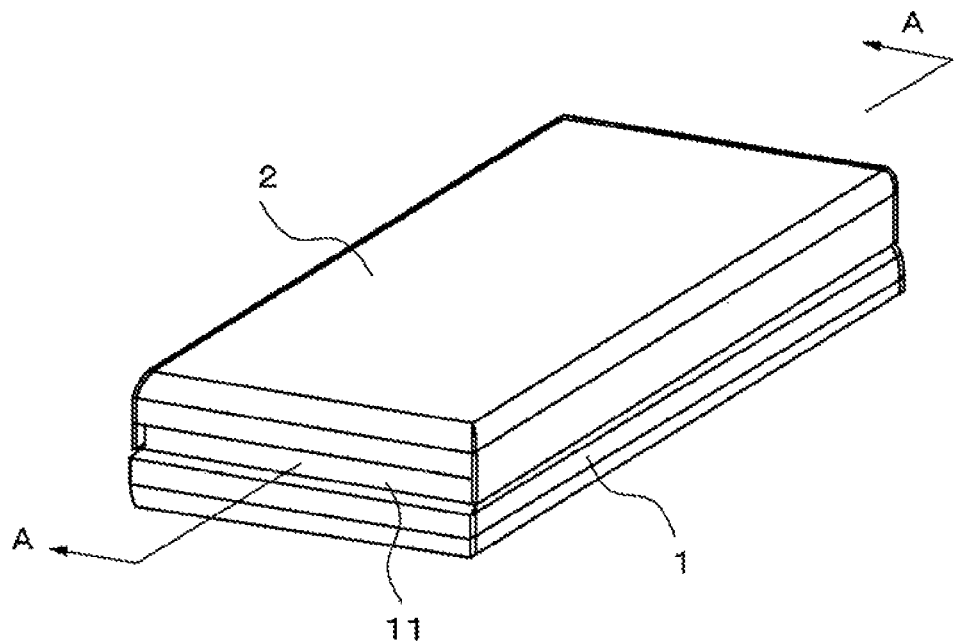
FIG. 1 A schematic perspective view showing a closed state of a slide type electronic apparatus, which indicates a first exemplary embodiment of the present invention FIG. 2 A schematic perspective view showing an opened state of a slide type electronic apparatus of this exemplary embodiment FIG. 3 A schematic exploded perspective view showing an opened state of a slide type electronic apparatus of this exemplary embodiment FIG. 4 A schematic exploded perspective view showing a closed state of a slide type electronic apparatus of this exemplary embodiment FIG. 5 A schematic exploded perspective view showing a closed state of a slide type electronic apparatus of this exemplary embodiment FIG. 6 A sectional view showing a state of a cover in a slide type electronic apparatus of this exemplary embodiment FIG. 7 A sectional view showing a state of a cover in a slide type electronic apparatus of this exemplary embodiment FIG. 8 A sectional view showing a state of a cover in a slide type electronic apparatus of this exemplary embodiment FIG. 9 A sectional view showing a state of a cover in a slide type electronic apparatus of this exemplary embodiment FIG. 10A A schematic cross sectional view showing an opened state of a slide type electronic apparatus, which indicates a second exemplary embodiment of the present invention FIG. 10B A schematic cross sectional view showing a closed state of a slide type electronic apparatus, which indicates the second exemplary embodiment of the present invention FIG. 11A A schematic cross sectional view showing a closed state of a slide type electronic apparatus, which indicates a third exemplary embodiment of the present invention FIG. 11B A schematic cross sectional view showing an opened state of a slide type electronic apparatus, which indicates the third exemplary embodiment of the present invention FIG. 12 A schematic cross sectional view of a slide type electronic apparatus, which indicates a fourth exemplary embodiment of the present invention FIG. 13 A schematic perspective view showing an opened state of a slide type electronic apparatus, which indicates the fourth exemplary embodiment of the present invention

1 and 1C First case
2, 2B and 2C Second case 3, 3B and 3B Cover
4 Opening
5 Slider
6 Torsion spring
11 and 11C Convex portion
12 Rail
21 Cover housing part
22 Spring holding part
23 Hinge shaft insertion hole
24 Slider installation plane part
25 Cover contact face
31 Cutout part
32 Spring spindle pin
33 Locking piece 33.
51 Rail fitting part
61 End projection
62 End projection
100 One case
200 Other case
300 Cover member
400 Gap
500 Slide mechanism

DESCRIPTION OF EMBODIMENTS

Next, the present invention will be described along with embodiments.

The First Embodiment

Figure 2:
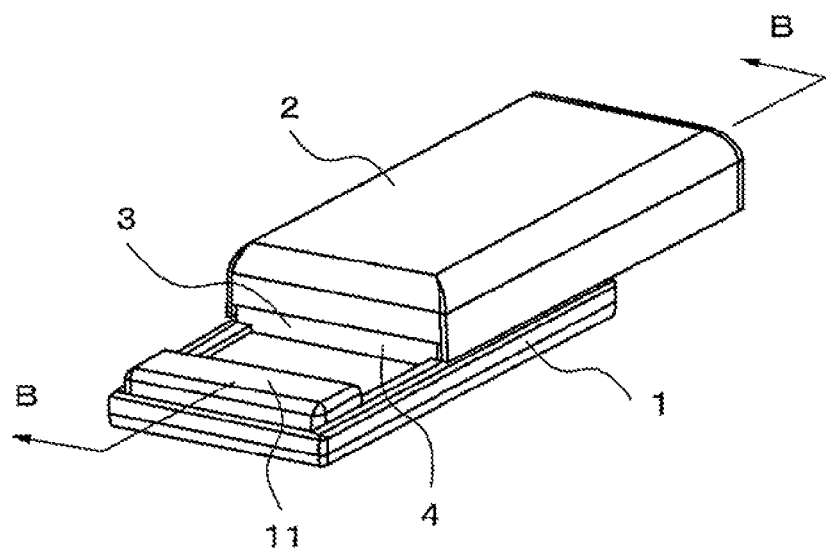

FIG. 1 is a schematic perspective view showing a closed state of a slide type electronic apparatus which indicates the first exemplary embodiment of the present invention. FIG. 2 is a schematic perspective view showing an opened state of a slide type electronic apparatus of this exemplary embodiment.

A slide type electronic apparatus of this exemplary embodiment has a first case 1 and a second case 2 engaged with the first case 1 by a slide mechanism. Here, the first case 1 corresponds to "the other case" and the second case 2 corresponds to "one case". In the first case 1, a key operation unit is arranged on a face (it is referred to as an opposed face) which is covered by the second case 2 at a state that the first case 1 and the second case 2 overlap (it is referred to as a closed state), and which is exposed at a state where the first case 1 and the second case 2 are extended and their overlap becomes smallest (it is referred to as an opened state), for example. In the second case 2, a display such as a liquid crystal display panel is arranged on a face in the opposing side of the opposed face, for example.

As shown in FIG. 2, a convex portion 11 is provided in an end of the first case 1 in a sliding direction as a stopper which contacts with the second case in the closed state in order for the cases not to slide further from the position of the closed state when they are shifted to the closed state from the opened state. On the other hand, in an end of the second case 2 in a sliding direction, an opening 4 that has walls in contact with a convex portion 11 in the closed state and receives the convex portion 11 is formed. Meanwhile, internal structure such as a slide mechanism which connects the first case 1 and the second case 2 and a flexible substrate are arranged in the back of the opening 4. Further inside the opening 4 of the second case 2, there is provided a plate-like cover 3 which, when the cases shift to the opened state from the closed state, turns to a position contacting with the opposed face of the first case 1 and then slides in a state that the opening 4 is closed.

Here, in the closed state, the cover 3 is in contact with the convex portion 11 of the first case 1 and turns in a direction away from the opposed face of the first case 1 and is housed inside the second case 2 in a state that it gets on the convex portion 11. At that time, the opening 4 is closed by the convex portion 11 of the first case 1. Accordingly, in the closed state, the internal structure such as a slide mechanism and a flexible substrate is hidden by the convex portion 11 of the first case 1.

On the other hand, in the opened state, the cover 3 that has gotten on the convex portion 11 turns to the position contacting with the opposed face of the first case 1 by the convex portion 11 of the first case 1 moving from the opening 4 of the second case 2 to outside of the second case 2. Accordingly, the internal structure such as a slide mechanism and a flexible substrate is hidden by the cover 3 in the opened state. Meanwhile, description of movement of the cover 3 will be made later.

Figure 3:
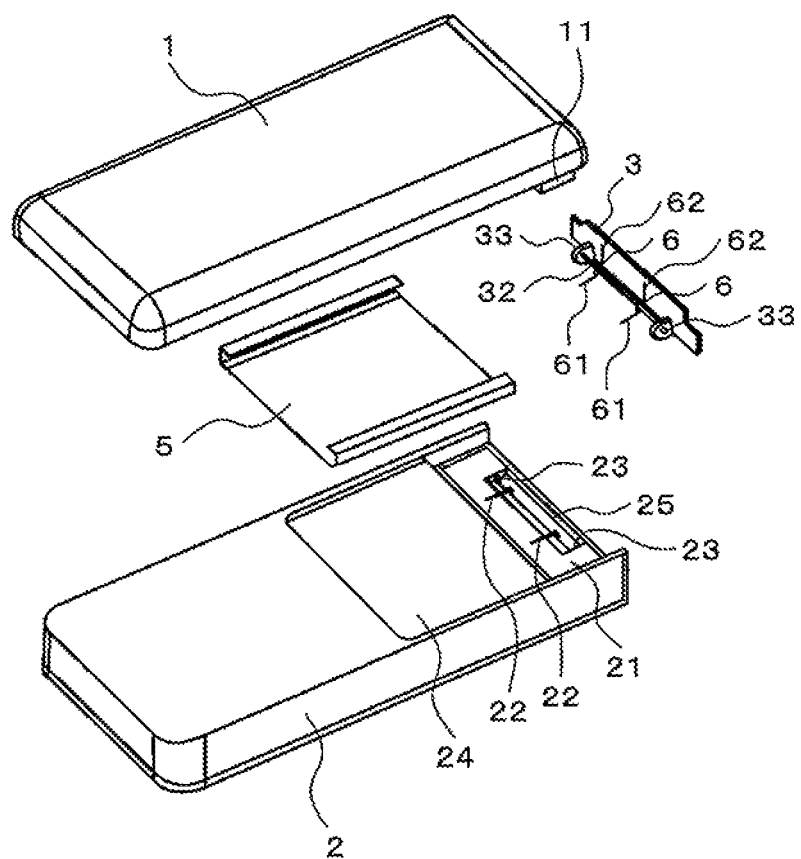
Figure 4:
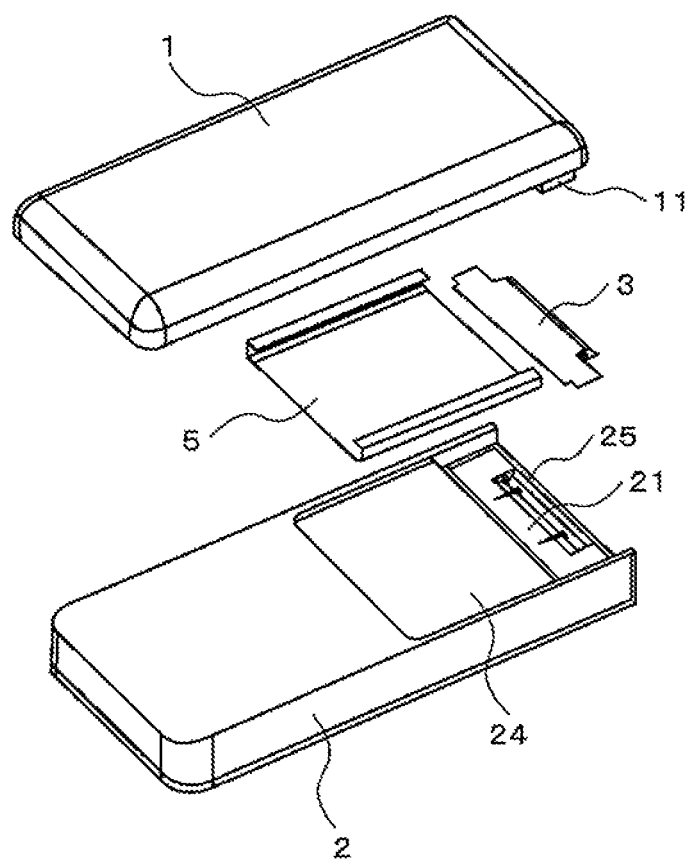
Figure 5:
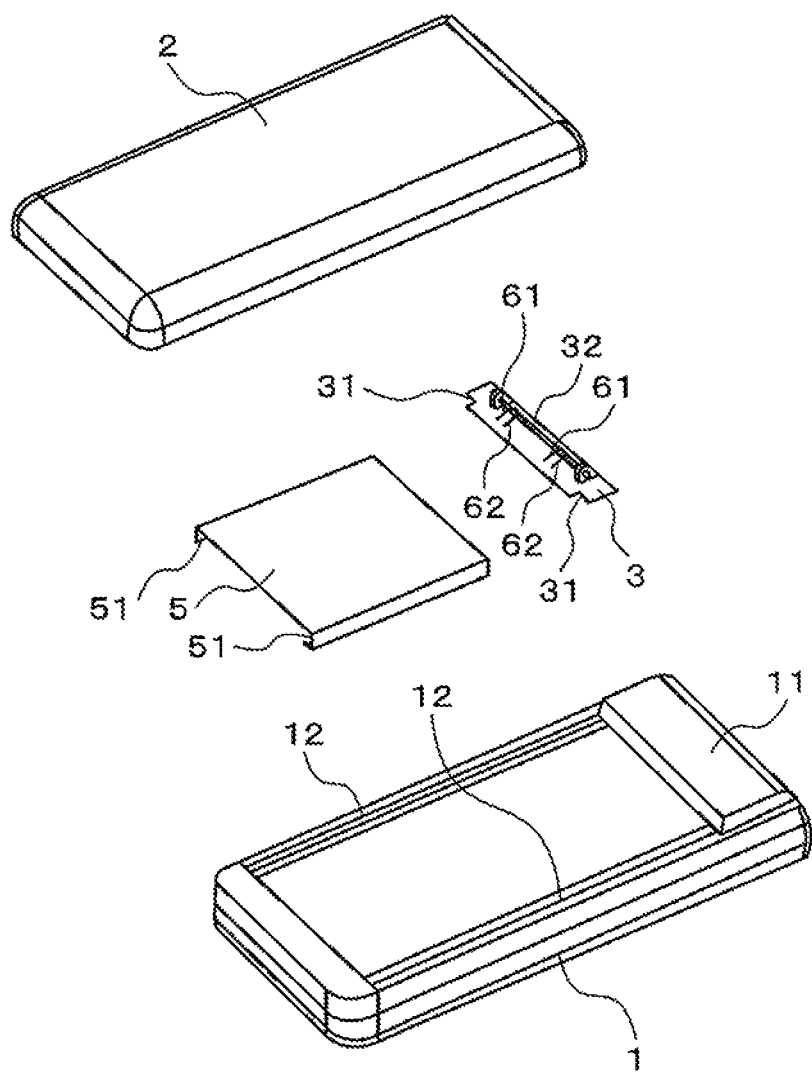

An assembling method of a slide type electronic apparatus of this exemplary embodiment will be described in detail with reference to FIGS. 3-5. FIG. 3 is a schematic exploded perspective view showing a state of the cover 3 in the opened state. FIGS. 4-5 are schematic exploded perspective views when a state of the cover 3 in the closed state is viewed from the opposite directions, respectively.

First, the cover 3 is installed in the second case 2. As shown in FIG. 3, there are two slot-like spring holding parts 22 provided in a cover housing part 21 formed in the second case 2. Then, each of end projections 61 of torsion springs 6 of the cover 3 is received in the spring holding parts 22. Also, in the cover housing part 21, there is provided one hinge shaft insertion hole 23 in each of the left and right end. By making the cover 3 be bent, a protruding portions of a locking pieces 33 provided in both sides of the cover 3 are inserted in the hinge shaft insertion holes 23, and the cover 3 is turnably installed in the cover housing part 21.

The torsion spring 6 is fixed by a spring spindle pin 32 pinched by the locking pieces 33. The other end projection 62 of the torsion spring 6 is fixed to the cover 3. In this exemplary embodiment, the torsion spring 6 is designed such that an angle formed by the end projections 61 and 62 is not less than 90 degrees in the state without the load. Meanwhile, according to this exemplary embodiment, although two torsion springs 6 are used, it is also possible to use one spring.

On the other hand, in the first case 1, two rails 12 for making a slider 5 slide are installed in both ends of the opposed face. As shown in FIG. 5, two rails 12 are installed in the opposed face of the first case 1 in a sliding direction. Then, a slider 5 is incorporated in the rail 12 which has been installed in the first case 1. Meanwhile, the slider 5 and the rail 12 correspond to a slide mechanism in the claims.

Further, the slider 5 is positioned in a plane part 24 of the second case 2, and the slider 5 and the second case 2 are fastened by a screw or the like. A slide type electronic apparatus according to this exemplary embodiment is obtained by coupling the first case 1 and the second case 2 via the rails 12 and the slider 5 which constitute a slide mechanism. Meanwhile, it is preferred to assemble it in the opened state in consideration of damage caused by contact to the cover 3.

Here, as shown in FIG. 5, according to this exemplary embodiment, in the opposed face of the first case 1, the portions to which the rails 12 are installed (two end portions) are formed such that they are higher than the other portions (the midsection where a key operation unit and the like are arranged). In two corners of the cover 3, there are provided cutout parts 31 for fitting the two end portions of the first case 1 (portions which are higher) when it is in contact with the opposed face of the first case 1. Meanwhile, when the portions where the rails 12 of the first case 1 are installed are made of the same height as the other portion, the cutout part 31 of the cover 3 is unnecessary.

In FIGS. 3-5, a state that the slider 5 is not installed in the rails 12 of the first case 1 is indicated in order to make it easy to understand. As mentioned above, the slider 5 is usually fastened with the second case 2 after being installed in the rails 12. Meanwhile, it is not limited to this depending on an assembly method.

In a slide type electronic apparatus which has obtained as mentioned above, in the opened state, the cover 3 contacts with the opposed face of the first case 1 by an urging force of the torsion spring 6 and presses the opposed face of the first case 1, as shown in FIG. 3. On the other hand, in the closed state, as shown in FIGS. 4-5, the cover 3 turns by being pressed by the convex portion 11 of the first case 1, and is housed in the cover housing part 21 of the second case 2 in the state that an urging force is applied in a direction that the first case 1 and the second case 2 are spaced apart each other.

Next, movement of the cover 3 and a slide type electronic apparatus will be described in detail using FIGS. 6-9. FIGS. 6-9 are sectional views taken in line A-A of FIG. 1 and line B-B of FIG. 2 when making a slide type electronic apparatus of this exemplary embodiment slide to the opened state from the closed state.

Figure 6:
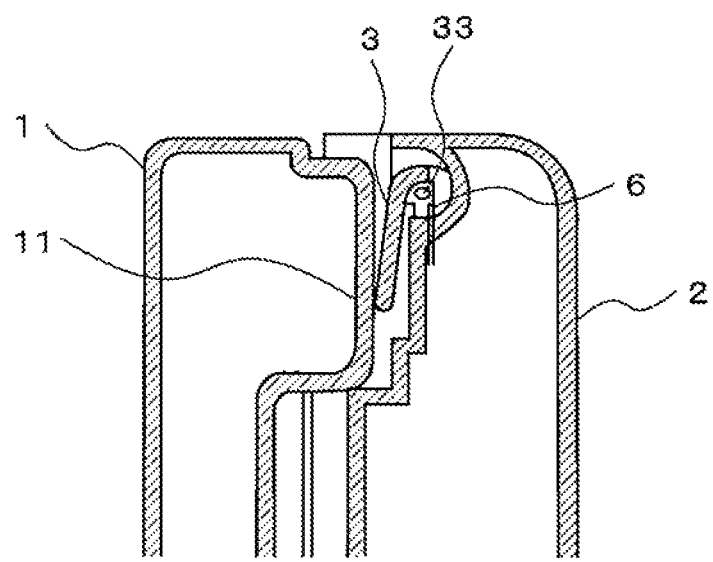

In the closed state, as shown in FIG. 6, the cover 3 is sandwiched between the convex portion 11 of the first case 1 and the second case 2. A turning force taking a pin 33 as the axis is given by an urging force of the torsion spring 6 to the cover 3 in a direction that it pushes the convex portion 11. Here, although there is play (gap) provided between the first case 1 and the second case 2 in order to realize a smooth slide, in the closed state, the cover 3 can suppress a backlash of the cases caused by the play by the cover 3 always pressing the convex portion 11 of the first case 1 and alienating the first case 1 and the second case 2.

Figure 7:
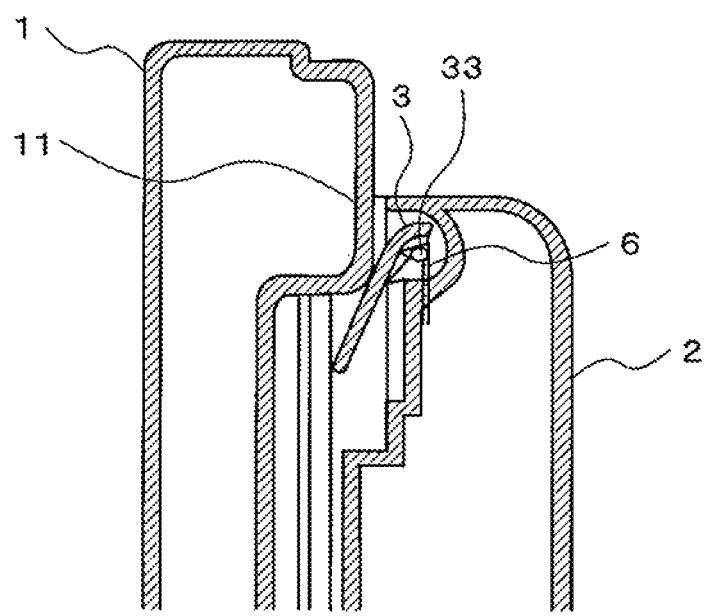

FIG. 7 indicates a state where shift from the closed state to the opened state has just begun by making the second case 2 slide against the first case 1. As shown in FIG. 7, the cover 3 is gradually opened while contacting to the corner of the convex portion 11 by an urging force of the torsion spring 6. Then, as shown in FIG. 8, after getting away from the convex portion 11 completely, the cover 3 touches the opposed face of the first case 1 and presses the opposed face of the first case 1 by an urging force of the torsion spring 6.

Figure 8:
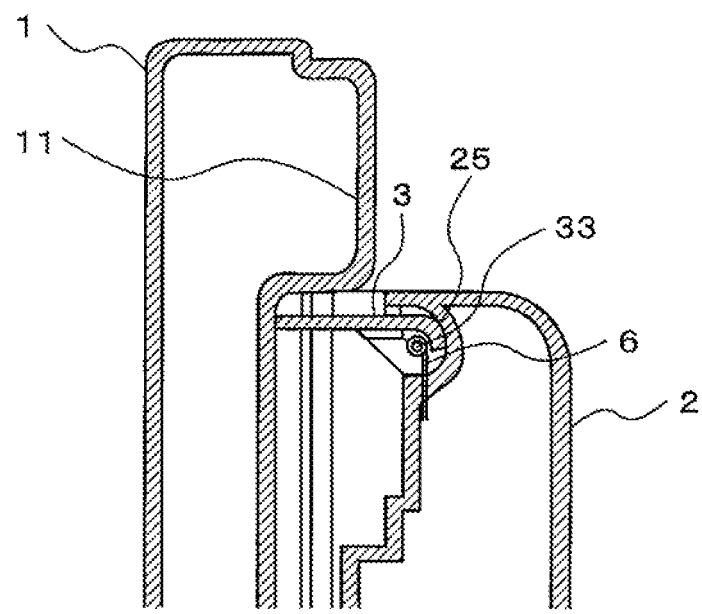
Figure 9:
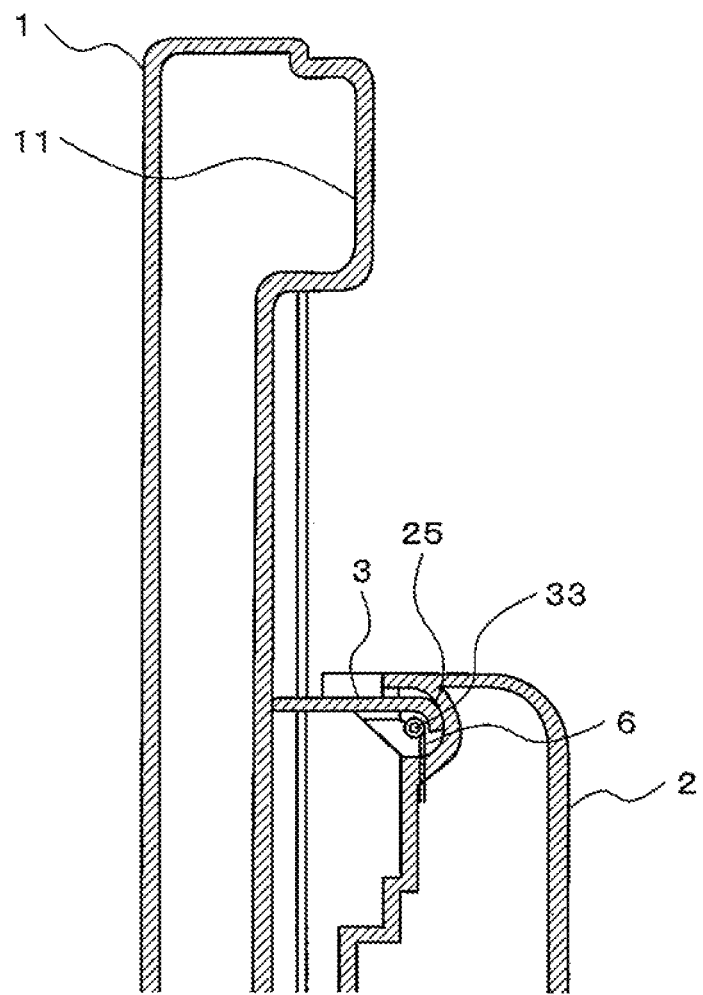

After that, as shown in FIG. 9, the cover 3 slides on the opposed face of the first case 1 while maintaining the state of FIG. 8 until the cases open completely. In this exemplary embodiment, the end of the cover 3, that is, the face which touches the opposed face of the first case 1 is formed into a smooth curved surface shape so as not to damage the opposed face of the first case 1 when sliding. By the cover 3 pressing the opposed face of the first case 1 by an urging force of the torsion spring 6, a certain load is applied between the cases, and a backlash by the play of the slide mechanism is suppressed.

According to this exemplary embodiment, when the cover 3 turns and touches the opposed face of the first case 1, the end of the cover 3 in the side opposed to the first case 1 side contacts with a contact face 25 in the cover housing part 21 of the second case 2. In other words, it has structure that the cover 3 does not turn by 90 degrees or more. Meanwhile, the contact face 25 corresponds to a stopping part of the claims.

According to this exemplary embodiment, the cover 3 that slides in a state that the opposed face of the first case 1 is pressed is provided in an end of the second case 2. In the opened state, by the opening 4 being closed by the cover 3, internal structure such as a slide mechanism and a flexible substrate which connects two cases electrically can be hidden. Also, it is possible to prevent dirt and dust invading from the opening 4.

Further, a backlash between the cases caused by play (gap) of the slide mechanism can be suppressed because the torsion spring 6 that biases the cover 3 so that the cover 3 may press the opposed face of the first case 1 is provided.

Meanwhile, it may be structured such that the cover 3 is pressed against the first case 1 only by the cutout part 31 for fitting the two end portions of the first case 1 whose height is a little higher, and a gap in a range where the internal structure cannot be visually recognized is left between the cover 3 and the midsection of the first case 1 (the portion where a key operation unit or the like is arranged).

In this case, a backlash between the cases can be similarly suppressed by the cutout part 31 of the cover 3 pressing the two end portions of the first case 1 while applying an urging force in the direction that the first case 1 and the second case 2 are alienated. On the other hand, when a step between the two end parts and the midsection of the first case 1 is small, the cover 3 having no cutout part 31 can be used.

A means to give an urging force to the cover 3 is not limited to the torsion spring 6. For example, as a means to give an urging force, an elastic body besides a torsion spring such as a leaf spring can be used. When the spring spindle pin 32 that fixes the torsion spring 6 tends to break, it is effective to apply a leaf spring.

Also, as a means to give an urging force to the cover 3, a magnet can be adopted. For example, magnets having polarities repelling each other are fixed on the cover and the second case 2, respectively. In this case, a magnet fixed on the cover 3 and a magnet fixed on the second case 2 repel each other, and an urging force is added to the cover 3 by this repelling force.

When a magnet is adopted as a means to give an urging force, a spring mounting part does not have to be formed. Accordingly, the structure becomes simple and cost reduction of the equipment can be achieved.

As material of the cover 3, suitable material such as a sheet metal or resin can be used. When the cover 3 is configured using a sheet metal, the cover 3 can be made thinner and its strength also improves. When the cover 3 is configured using mold resin, the spring which gives an urging force to the cover 3 can be formed into a bellows shape by mold resin. In that case, the cover 3 and the spring can be formed integrally.

The Second Embodiment

Figure 10A:
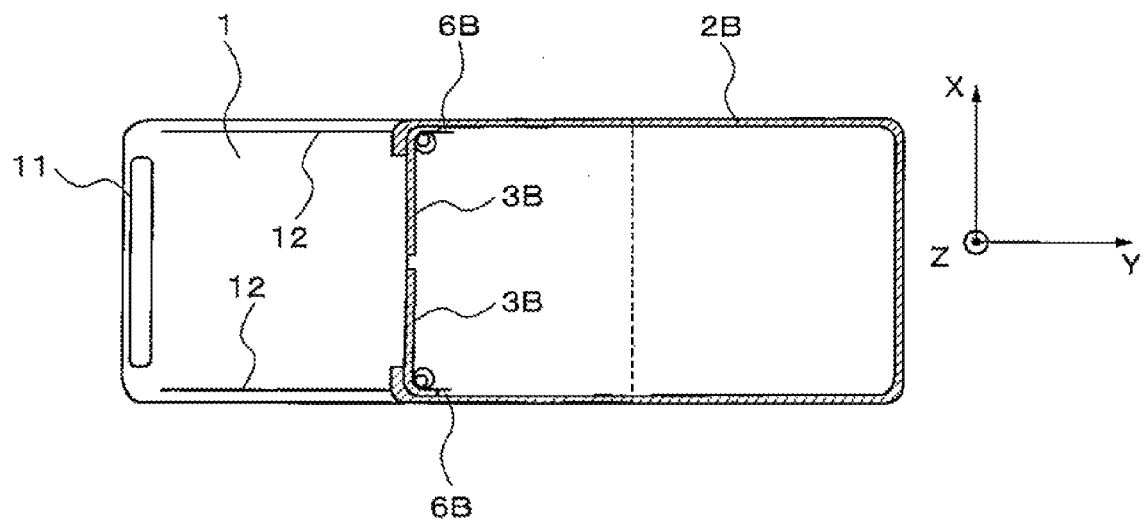
Figure 10B:
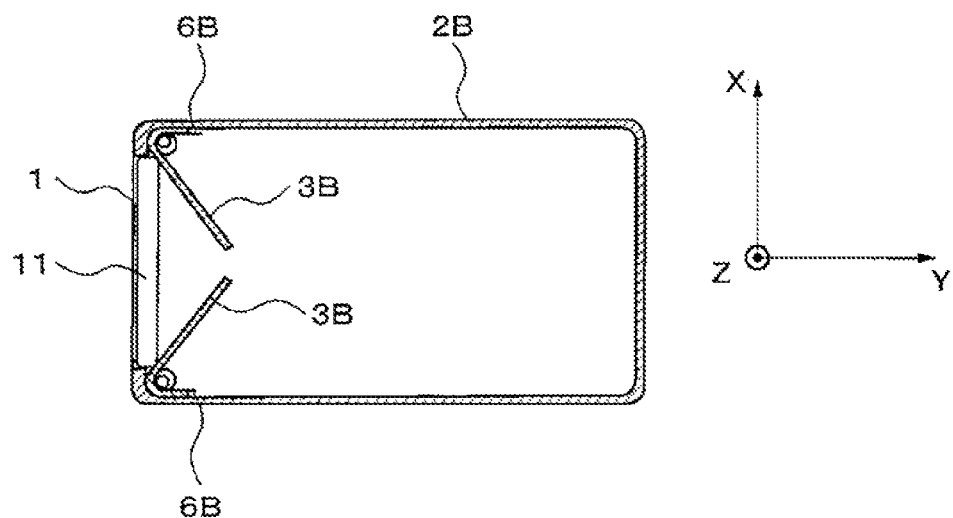

FIG. 10A is a schematic cross sectional view showing the opened state of a slide type electronic apparatus which indicates the second exemplary embodiment of the present invention and FIG. 10B is a schematic cross sectional view showing the closed state thereof;

In the first exemplary embodiment, a mechanism in which the cover 3 turns about the spring spindle pin 32 parallel to the width direction (X-direction) of the cases has been adopted. In contrast, according to this exemplary embodiment, casement-door-type covers 3B and 3B which turn about a spindle parallel to the thickness wise direction (Z-direction) of the cases are adopted in two positions of both sides of an end of the second case 2B.

In the opened state, as shown in FIG. 10A, the two covers 3B and 3B are biased by torsion springs 6B and 6B from the left side and the right side of the second case 2B and turn to the edge of the second case 2B and thus the opening is covered. On the other hand, in the closed state, the two covers 3B and 3B are pushed by the convex portion 11 of the first case 1 and are housed inside the second case 2B as shown in FIG. 10B.

According to this exemplary embodiment, cover mechanisms are generally installed in the left and right spaces of a case end which is rarely used for mounting or the like of electrical components. In this case, as is not the case in the first exemplary embodiment, a space for installing a cover mechanism does not need to be reserved in the top to bottom spaces of the case end which is a space required for mounting or the like of electrical components. Accordingly, the top to bottom spaces of the case end can be utilized effectively as a mounting space for mounting electrical components.

The Third Embodiment

Figure 11A:
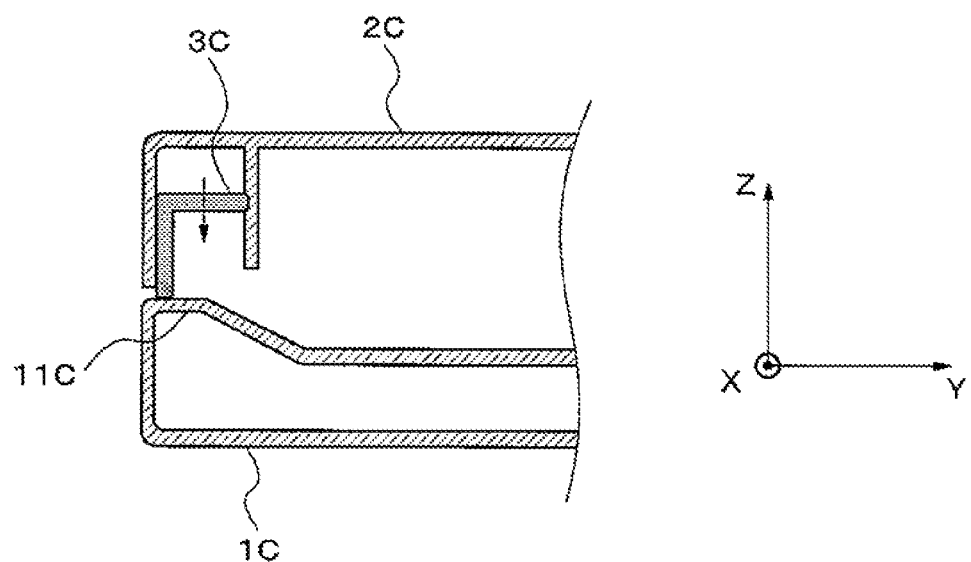
Figure 11B:
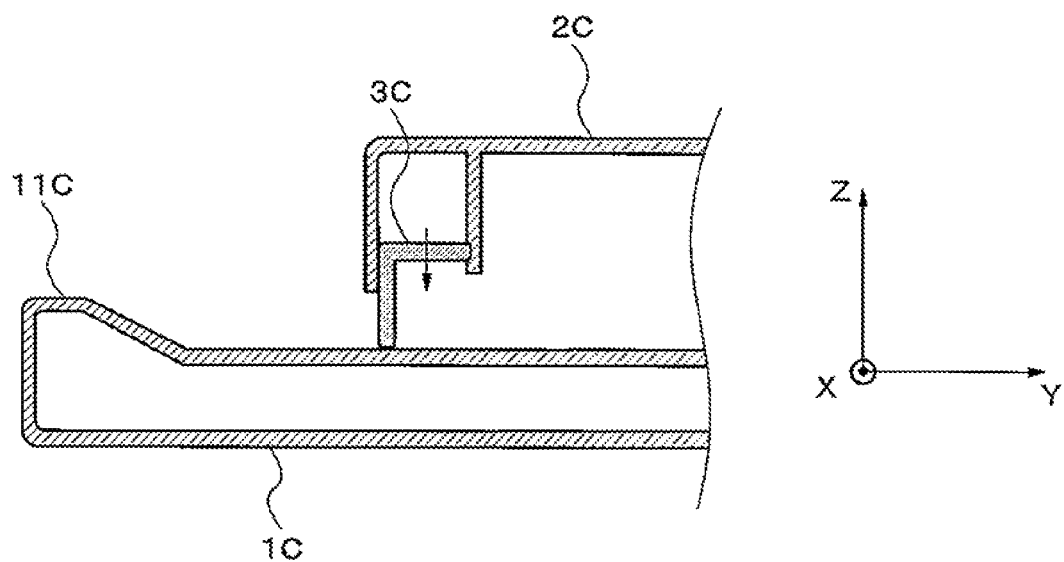

FIG. 11A is a schematic cross sectional view showing the closed state of a slide type electronic apparatus which indicates the third exemplary embodiment of the present invention, and FIG. 11B is a schematic cross sectional view showing the opened state thereof.

In the first exemplary embodiment, a mechanism in which the cover 3 turns about the spring spindle pin 32 parallel to the width direction of the cases (X-direction) has been adopted. In contrast, according to this exemplary embodiment, a system to move a cover 3C in the thickness wise direction of the cases (Z-direction) is adopted.

The cover 3C of this exemplary embodiment is mounted on the second case 2C and is biased by a spring or the like in the direction toward the first case 1C (the direction indicated by the arrow). In the closed state, the tip part of the cover 3C is lifted by the top face of a convex portion 11C of the first case 1C, and is housed inside the second case 2C as shown in FIG. 11A.

On the other hand, in the opened state, because the convex portion 11C gets away from the second case 2C as shown in FIG. 11B, the cover 3C moves toward the first case 1C side by an urging force in the direction toward the first case 1C (the direction indicated by the arrow) and its tip part is in contact with the opposed face of the first case 1C. Accordingly, internal structure such as a slide mechanism and a flexible substrate which is connected with two cases electrically is hidden by the cover 3C.

In the case of this exemplary embodiment, in order to avoid the cover 3C colliding with the convex portion 11C of the first case 1C when shifting to the closed state from the opened state, it is desirable to form a side face of the convex portion 11C in the side which contacts with the cover 3C such that it has a sloping surface shape inclining gently from the top face of the convex portion 11C to the opposed face of the first case 1C. In this exemplary embodiment, a triangle-shape sloping surface rib which does not touch a slide mechanism and a flexible substrate or the like at the closed state is adopted, and the sloping surface rib is formed integrally with the first case 1C.

According to this exemplary embodiment, because the movable direction of the cover 3C is of structure movable only in the thickness wise direction (Z-direction) of the cases, even if the cover 3C is pushed by a finger or the like from outside, there are no cases that the cover 3C falls down toward the inside. Accordingly, internal parts such as a slide mechanism and a flexible substrate can be protected, and thus improvement of reliability of a slide type electronic apparatus can be achieved.

The Fourth Embodiment

Figure 12:
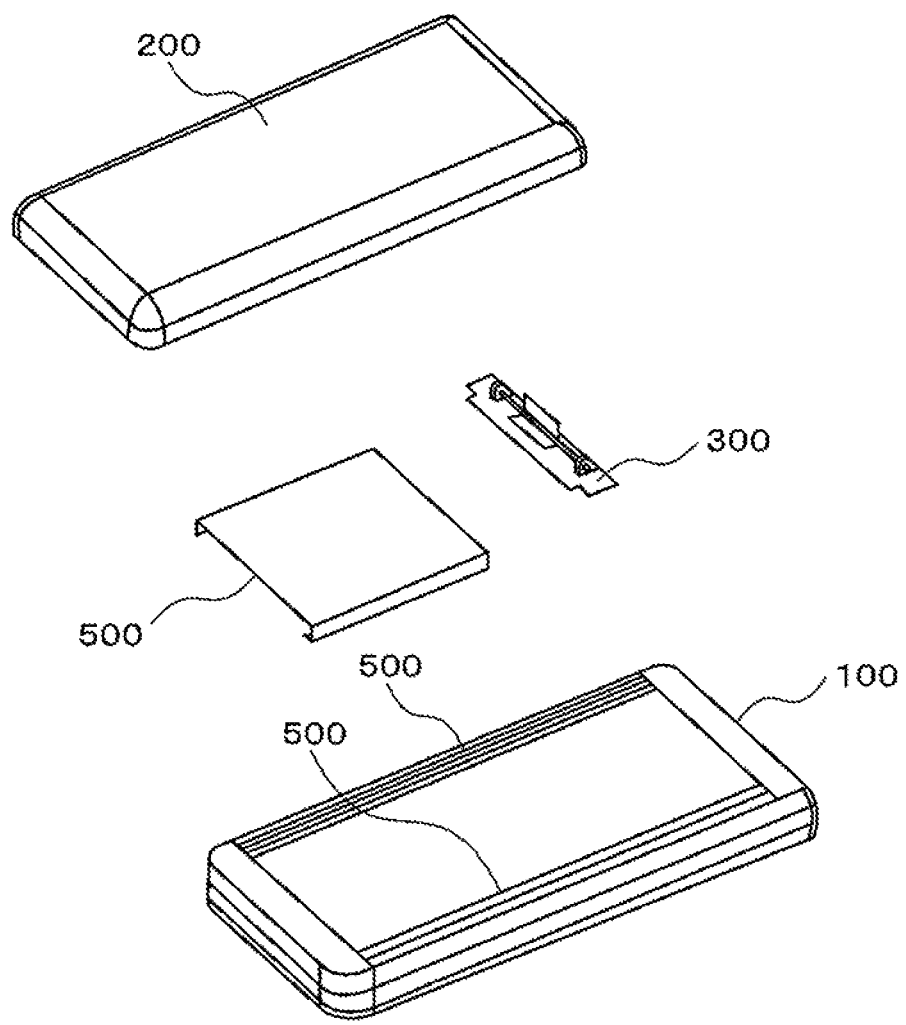

A slide type electronic apparatus which indicates the fourth exemplary embodiment of the present invention will be described. FIG. 12A is a schematic cross sectional view of a slide type electronic apparatus according to this exemplary embodiment, and FIG. 13 is a schematic perspective view showing the opened state of a slide type electronic apparatus of this exemplary embodiment.

In FIG. 12A, a slide type electronic apparatus according to this exemplary embodiment includes: two cases 100 and 200; a slide mechanism 500 which is arranged between the two cases 100 and 200 and slidably connects the two cases 100 and 200; and a cover member 300 which is arranged in the case 200 which is one of the two cases and hides a slide mechanism 500 at least in the opened state where overlap of the two cases 100 and 200 becomes smallest.

Figure 13:
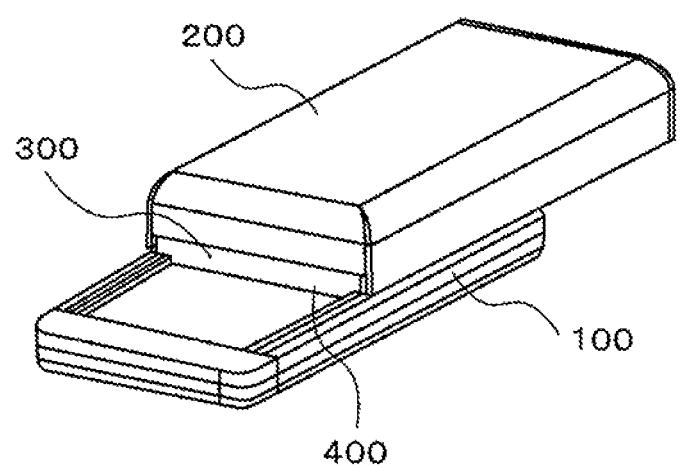

Generally, in a slide type electronic apparatus, given play (gap 400) is provided between the two cases 100 and 200 facing each other sandwiching the slide mechanism 500 in order to realize a smooth slide as shown in FIG. 13. When the gap 400 is large, internal structure such as the slide mechanism 500 and a flexible substrate is seen from the gap 400. When dirt, dust and the like tends to enter from the gap 400 and dirt, dust and the like enters in the cases, it will be a factor of malfunction of a slide type electronic apparatus.

In a slide type electronic apparatus according to this exemplary embodiment, there is arranged in one case 200 a cover member 300 which hides the gap 400 at least in the opened state where an overlap of the two cases 100 and 200 becomes smallest. Accordingly, even when the gap 400 is formed between the two cases 100 and 200 facing each other sandwiching the slide mechanism 500, it is possible to prevent internal structure such as the slide mechanism 500 and a flexible substrate from seen trough the gap 400. Further, by hiding the gap 400 by the cover member 300, invasion of dirt and dust and the like from the gap 400 can be suppressed.

Other Exemplary Embodiments

In another exemplary embodiment, a slide type electronic apparatus is set such that the first case and the second case are engaged by a slide mechanism so that they can slide each other, and an overlap of them becomes biggest at the closed state and smallest at the opened state. This slide type electronic apparatus is characterized in that a cover which slides while contacting with at least part of the opposed face of the first case and hides a gap between the first and second cases arising from a slide mechanism is provided in an end of the second case.

Here, because a gap is formed between two cases opposing each other sandwiching a slide mechanism when a cover is not provided in an end of the second case, internal structure such as a slide mechanism and a flexible substrate which connects the two cases electrically become visible from this gap. In this case, the outward appearance as a product, the quality or impression on the appearance design deteriorates.

In addition, dirt, dust and the like is easy to enter from this gap, and thus it becomes a cause of a malfunction. Further, in a slide mechanism, minimum play between a sliding part and a guide groove is provided in order to realize a smooth slide. In this case, in the opened state or the closed state, a backlash is formed between the two cases, and an impression as a product becomes deteriorates.

In contrast, because a slide type electronic apparatus according to this exemplary embodiment has a cover for the gap which has been formed between the two cases opposing each other sandwiching a slide mechanism, it is possible to prevent internal structure such as a slide mechanism and a flexible substrate from being seen from this gap. In addition, dirt and dust invading from this gap can be suppressed, and reliability of the equipment can be improved.

In the opened state, the cover is exposed to an external appearance face. Accordingly, it is possible to design the cover as a design component, and thus user's eagerness to buy can be enhanced.

Further, by the cover sliding while contacting to at least part of the opposed face of the first case, a backlash produced by the slide mechanism can be suppressed. In this case, it is possible to improve the product quality and give a posh flavor to the equipment.

Although the present invention has been described with reference to the exemplary embodiments above, the present invention is not limited to the above-mentioned exemplary embodiments. Various modifications which a person skilled in the art can understand can be made to the composition and the details of the present invention in the scope of the present invention.

This application claims priority based on Japanese application Japanese Patent Application No. 2008-242678 filed on Sep. 22, 2008, the disclosure of which is incorporated herein in its entirety.

INDUSTRIAL APPLICABILITY

A slide type electronic apparatus according to the present invention can be applied to an electronic apparatus such as a mobile phone, PHS, a PDA or a small personal computer which includes two cases connected in a manner they can slide and move relatively each other.

The invention claimed is:

1. A slide type electronic apparatus, comprising:
   two cases;
   a slide part which is arranged between said two cases and connects said two cases in a manner said two cases can slide each other;
   a covering part which is arranged in one of said cases and hides a gap formed between said two cases at least at a time of an opened state in which an overlap of said two cases becomes smallest; and
   a convex portion which is arranged at other of said cases and hides said gap when contacting said one case,
   wherein said convex portion contacts said one case by said covering part turning when shifting from said opened state to a closed state in which said two cases overlap most.

2. The slide type electronic apparatus according to claim 1, wherein said one case comprises a wall that is in contact with said convex portion in said closed state and an opening that houses said convex portion, and
   wherein said covering part hides said gap by closing said opening when in an opened state.

3. The slide type electronic apparatus according to claim 2, wherein said covering part is a flat-plate body; and
   wherein, when in an opened state, said flat-plate body closes said opening by being arranged perpendicular to a sliding direction.

4. The slide type electronic apparatus according to claim 3, wherein said flat-plate body turns so as that said flat-plate body becomes parallel to an opposed face of said case when shifting to a closed state from an opened state.

5. The slide type electronic apparatus according to claim 3, wherein said flat-plate body turns so as that said flat-plate body becomes parallel to a side face of said case, when shifting to a closed state from an opened state.

6. The slide type electronic apparatus according to claim 5, wherein said covering part is two flat-plate bodies arranged in ends of one case facing each other, and
   wherein said two flat-plate bodies are turned by a gatefold mechanism when shifting to a closed state from an opened state.

7. The slide type electronic apparatus according to claim 1, wherein said one case comprises a bias member which presses said other case via said cover member.

8. The slide type electronic apparatus according to claim 7, wherein said one case comprises stopping part which holds said covering part in a state that said covering part presses said other case at least in an opened state.

9. The slide type electronic apparatus according to claim 7, wherein said bias part is an elastic body.

10. The slide type electronic apparatus according to claim 7, wherein said bias part is a magnetic material.

11. A slide type electronic apparatus, comprising:
    two cases;
    slide means, which is arranged between said two cases, for connecting said two cases in a manner said two cases can slide each other;
    covering means, which is arranged in one of said cases, for hiding a gap formed between said two cases at least at a time of an opened state in which an overlap of said two cases becomes smallest; and
    a convex portion which is arranged at other of said cases and hides said gap when contacting said one case,
    wherein said convex portion contacts said one case by said covering means turning when shifting from said opened state to a closed state in which said two cases overlap most.

* * * * *